(12) United States Patent
Abraham et al.

(10) Patent No.: US 8,644,641 B2
(45) Date of Patent: Feb. 4, 2014

(54) METHOD AND CONTROL UNIT FOR RECTIFYING A CAMERA IMAGE

(75) Inventors: Steffen Abraham, Hildesheim (DE); Axel Wendt, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 706 days.

(21) Appl. No.: 12/806,017

(22) Filed: Aug. 3, 2010

(65) Prior Publication Data
US 2011/0044557 A1  Feb. 24, 2011

(30) Foreign Application Priority Data
Aug. 20, 2009  (DE) .......................... 10 2009 028 743

(51) Int. Cl.
*G06K 9/40* (2006.01)

(52) U.S. Cl.
USPC ........................................................ 382/275

(58) Field of Classification Search
USPC .............. 382/154, 275; 345/547; 348/208.99, 348/223.1
See application file for complete search history.

(56) References Cited

U.S. PATENT DOCUMENTS

| | | | |
|---|---|---|---|
| 4,558,302 A | 12/1985 | Welch | |
| 2005/0259158 A1* | 11/2005 | Jacob et al. | 348/218.1 |
| 2007/0188619 A1* | 8/2007 | Kurata | 348/208.99 |
| 2008/0002879 A1 | 1/2008 | Jeon et al. | |
| 2009/0067744 A1* | 3/2009 | Kawanishi et al. | 382/274 |

FOREIGN PATENT DOCUMENTS

| | | |
|---|---|---|
| DE | 102 29 336 | 1/2004 |
| WO | WO 02/078346 | 10/2002 |
| WO | WO 02/095681 | 11/2002 |

OTHER PUBLICATIONS

D. A. Huffman: A Method for the Construction of Minimum Redundancy Codes, Proceedings of the IRE, 40, 1098-1101 (1952).

* cited by examiner

*Primary Examiner* — Amara Abdi
(74) *Attorney, Agent, or Firm* — Kenyon & Kenyon LLP

(57) ABSTRACT

A method for rectifying a camera image includes: receiving a plurality of distorted pixels of a distorted camera image; receiving a compressed rectifying rule, via an interface; and performing a decompression of the compressed rectifying rule, in order to obtain a decompressed rectifying rule for rectifying the distorted camera image. A plurality of rectified pixels of a distorted camera image is determined from the plurality of distorted pixels, using the decompressed rectifying rule.

7 Claims, 3 Drawing Sheets

METHOD AND CONTROL UNIT FOR RECTIFYING A CAMERA IMAGE

BACKGROUND OF THE INVENTION

1. Field of the Invention

The present invention relates to a method and a control unit for rectifying a camera image.

2. Description of Related Art

Stereo-video image processing is of meaningful significance for recording the surroundings in driver assistance systems, for robotics and additional applications of automation technology. The spatial position of objects in the camera nearfield is able to be determined using a stereo-video system. For instance, using it, one is able to detect a pedestrian in the vehicle's nearfield, in driver assistance systems of a vehicle. The requirements on the problem definition of image processing keep increasing in this context. This also relates especially to the increase in the geometric accuracy, in conjunction with higher processing speed.

Published German patent document DE 102 29 336 A1 describes a method for calibrating image sensor systems using a calibration object.

Published U.S. patent application document U.S. 2008/0002879 describes a method in which the vectors for the rectification in pixel clock have to be mathematically recalculated in each case. This saves memory, but increases the computing power required for the continuous calculation of the rectification rule.

BRIEF SUMMARY OF THE INVENTION

The present invention provides a method for rectifying a camera image, a method for rectifying a stereo camera image, a method for compressing a look-up table, and a control unit using these methods.

The crux of the present invention is a method for the memory-saving compression of a look-up table (LUT) and for real time decompression capability of the look-up table, which is suitable for rectifying an image, for instance, in a stereo-video system. This makes possible a method for rectifying or rather for real time image rectifying, which is able to be used as a sub-step of a 3D stereo measurement. The method is particularly suitable for use with FPGA-based or ASIC-based computer hardware.

In comparison to known methods, according to the present invention, by coding the look-up table, the data volume to be stored and transferred is able to be reduced in a way as is required in real time processing. For FPGA-based or ASIC-based hardware, this saves costly storage space for the internal storage of the look-up table. Therefore, the bandwidth for memory access may be greatly reduced. On the other hand, it is true that additional coding has to be performed, but according to the present invention, this may be implemented using very little computing effort. This permits doing the stereo-real time processing using cost-effective hardware.

The present invention provides a method for rectifying a camera image, having the following steps: receiving a plurality of distorted pixels of a distorted camera image, via an interface; receiving a compressed rectifying rule via an interface; decompressing the compressed rectifying rule, in order to obtain a decompressed rectifying rule for rectifying the distorted camera image; and determining a plurality of rectified pixels of a rectified camera image from the plurality of distorted pixels, using the decompressed rectifying rule.

The camera image is able to represent a taking by an optical image recording device, for instance, a video camera. Thus, a camera image may be a video image. The camera image may be built up of the plurality of individual pixels. The pixels, in this context, may be arranged in a predetermined manner, such as in matrix form, to form the camera image. The camera image may be distorted based on intrinsic and extrinsic parameters. These parameters may be determined, for instance, during a calibration of the image recording device and stored. In order to determine the pixels from the distorted pixels, the rectifying rule may have an association between the rectified and the distorted pixels. The association may be based on the intrinsic and the extrinsic parameters. Consequently, the distorted camera image may be rectified using the rectifying rule. The rectifying rule may have displacement vectors for this, for example, which allocate a new position to the distorted pixels, in order to obtain the rectified image. The compressed rectifying rule may have the allocation included in the rectifying rule in a coded, and particularly a compressed form. The compressed rectifying rule may represent a look-up table that is present in a compressed form. The distortion may be, for instance, a barrel-shaped or a pincushion-shaped distortion. The method according to the present invention may be executed by a suitable device, for instance, a control unit. Thus, the distorted camera image and the compressed rectifying rule may be received via one or more interfaces of the control unit. The distorted camera image and the compressed rectifying rule may be received simultaneously or successively in time. In this context, for each step of the receiving of a distorted camera image, a step of the receiving of a compressed rectifying rule may be carried out. This means that no storage of the compressed rectifying rule in the control unit is required. In particular, the method is able to be carried out in real time. As a result, the steps of receiving the compressed rectifying rule, of the decompressing and of determining a plurality of rectified pixels may be carried out within a time span that is equal to, or smaller than a time span between the receiving of two successive distorted camera images.

According to the present invention, the decompressed rectifying rule may have a plurality of displacement vectors. The displacement vectors may define associations between the plurality of distorted pixels and the plurality of rectified pixels. A displacement vectors may define how a distorted pixel is to be displaced so as to develop a rectified pixel. A displacement vectors may thus associate with one another corresponding pixels from the quantity of the distorted pixels and the quantity of the rectified pixels. Consequently, at least one displacement vector may be assigned to each rectified pixel or alternatively to each distorted pixel. The displacement vectors may be situated in a look-up table, which may have a structure that corresponds to a structure of the pixels of the rectified camera image or the distorted camera image.

The compressed rectifying rule may have a plurality of displacement vector entries. During decompressing of the compressed rectifying rule, one displacement vector of the plurality of displacement vector entries may be determined for each of the plurality of rectified pixels. The displacement vector entries may represent a compressed form of the displacement vectors. For the compressing and the decompressing, known compression methods may be used.

According to one example embodiment, one subsequent displacement vector may be determined from a subsequent displacement vector entry that is assigned to a subsequent rectified pixel, and from a preceding displacement vector assigned to a preceding rectified pixel. Thus, information for forming a displacement vector may be divided into a plurality of displacement vector entries. The subsequent pixel with which the subsequent displacement vector entry and the subsequent displacement vector are associated, and the preceding pixel with which the preceding displacement vector entry and the preceding displacement vector are associated, may be arranged in a predetermined sequence. For instance, the subsequent pixel and the preceding pixel may be arranged to be adjacent.

In this instance, the subsequent displacement vector entry is able to define a difference amount from the preceding displacement vector. Consequently, it is sufficient if the compressed rectifying rule essentially includes changes between individual displacement vectors.

According to another example embodiment, the compressed rectifying rule may have a plurality of run length entries and a plurality of difference change entries. A subsequent displacement vector of a subsequent rectified pixel may be equivalent to a preceding displacement vector of a preceding rectified pixel, if a run length entry assigned to the subsequent rectified pixel has a first value. Moreover, the subsequent displacement vector may be determined from the preceding displacement vector and a difference change entry assigned to the subsequent rectified pixel, if the run length entry assigned to the subsequent rectified pixel has a second value. For example, the first value of the assigned run length entry may represent a logical zero and the second value a logical one, or vice versa. Thus, the run length entries may be a function of a number of consecutive, unchanged displacement vectors. A sequence of the individual displacement vectors may be specified, in this context, and may correspond, for instance, to an arrangement of the rectified pixels of the rectified camera image. In the sequence given, if a value of a displacement vector changes, a corresponding change may be specified in absolute quantity and according to algebraic sign by the corresponding difference change entry. In this way, the magnitude of the compressed rectifying rule may be further reduced. Alternatively, other known coding methods may be used for the data compression. For example, Huffman codes, described in D. A. HUFFMAN: A Method for the Construction of Minimum Redundancy Codes, Proceedings of the IRE, 40, 1098-1101 (1952), or LZW methods according to U.S. Pat. No. 4,558,302 may be used.

The method steps may advantageously be executed in such a way that the method has real time capability. Such a method is suitable, for example, for the recording of the surroundings in a driver assistance system of a vehicle.

The present invention also provides a method for rectifying a stereo-camera image, having the following steps: receiving a plurality of first distorted pixels of a first distorted camera image and a plurality of second distorted pixels of a second distorted camera image, via an interface; receiving a first compressed rectifying rule and a second compressed rectifying rule, via an interface; decompressing the first compressed rectifying rule and the second compressed rectifying rule, so as to obtain a first decompressed rectifying rule for rectifying the first distorted camera image and a second decompressed rectifying rule for rectifying the second distorted camera image; and determining a plurality of first rectified pixels of a first rectified camera image from the plurality of first distorted pixels, using the first decompressed rectifying rule and a plurality of second rectified pixels of a second rectified camera image from the plurality of second distorted pixels, using the second decompressed rectifying rule. In this context, the method steps assigned to the first and the second camera image may in each case be executed in parallel. The two rectified camera images may be used for a determination of distance. Consequently, it is possible to have a real time stereo-video rectification in the case of very high-resolution video cameras. The method according to the present invention is able to build up on methods for stereo rectification as described in published international patent application WO 02/078346 A1 or WO 02/095681 A1.

The present invention also provides a method for compressing a look-up table for rectifying a camera image, having the following steps: receiving a plurality of displacement vectors via an interface, the plurality of displacement vectors defining associations between distorted pixels of a distorted camera image and rectified pixels of a rectified camera image; determining a plurality of displacement vector entries, a displacement vector entry in each case defining a change between at least two of the plurality of displacement vectors; and providing a compressed look-up table, which has the plurality of displacement vector entries. The displacement vectors may be ascertained, for instance, during a camera calibration. For additional compressing, the displacement vector entries may be coded additionally, for instance, using run length coding.

The present invention also provides a method for decompressing a compressed look-up table for rectifying a camera image, having the following steps: receiving the compressed look-up table via an interface, the look-up table having a plurality of displacement vector entries, which each define a change between at least two of a plurality of displacement vectors; determining a plurality of displacement vectors from the plurality of the displacement vector entries, the plurality of displacement vectors defining associations between distorted pixels of a distorted camera image and rectified pixels of a rectified camera image; and providing a plurality of displacement vector entries.

The present invention also provides a control unit or a computing hardware which are developed to carry out or implement the steps of the method according to the present invention. The object of the present invention may be achieved quickly and efficiently by this embodiment variant of the present invention in the form of a control unit, as well.

In the case at hand, a control device is an electric device that processes sensor signals and outputs control signals as a function thereof. The control unit has an interface, which may be implemented as hardware and/or software. In a hardware design, the interfaces may, for example, be part of a so-called system ASIC that contains the most different functions of the control unit. However, it is also possible for the interfaces to be separate, integrated circuits or to be at least partially made up of discrete components. In a software type of development the interfaces may be software modules which are present, for instance, on a microcontroller, besides other software modules.

Also advantageous is a computer program product having program code which is stored in a machine-readable medium such as a semiconductor memory, a hard-disk storage or an optical memory, and is used to implement the method according to one of the specific embodiments described above, when the program is executed in a control unit.

To implement a rectification in reality, the example embodiments according to the present invention may be varied. Thus, the processing of video image data may take place sequentially in a rectifying hardware (e.g. FPGA+RAM). An Input is provided, in this context, into which the camera image data (brightness values) are input in pixel clock, and an output is provided from which rectified image data are provided in pixel clock. Furthermore, there may be an input buffer in which a limited number of rows of input image may be filed. Consequently, the entire image is not filed in the memory.

Moreover, the rectified output image may be continuously computed, and from this an output signal may be generated. That is, the output image does not have to be stored in the rectifying hardware.

For the implementation of an FPGA, the LUT for the rectifying may be filed in the FPGA itself or in an external RAM component. When filing is made in the more cost-effective external RAM, a high data transfer rate is produced between the RAM and the FPGA, which has an unfavorable effect. In the filing of the complete LUT in the FPGA, much relatively more expensive memory is required in the FPGA.

These two disadvantages are avoided by compressing the LUT. The compressing of the LUT takes place specifically in such a way that it may be decoded sequentially in pixel clock, using limited computing effort. Thus in the memory of the FPGA there is only the currently decoded vector that is needed for the computation of the current output pixel. The entire decoded LUT is not completely stored in the hardware.

The storing of the compressed LUT may be done both in the FPGA itself or externally in the RAM.

Thus, sequential processing may take place. This refers to the decoding of the LUT and the rectifying of the image. Consequently, the images and the LUT are each not present completely in the memory of the hardware (FPGA).

Moreover, storing of the LUT in the (FPGA/ASIC) itself is possible. Because of that, a multiple transmission of the LUT is not required.

DETAILED DESCRIPTION OF THE INVENTION

Figure 1:
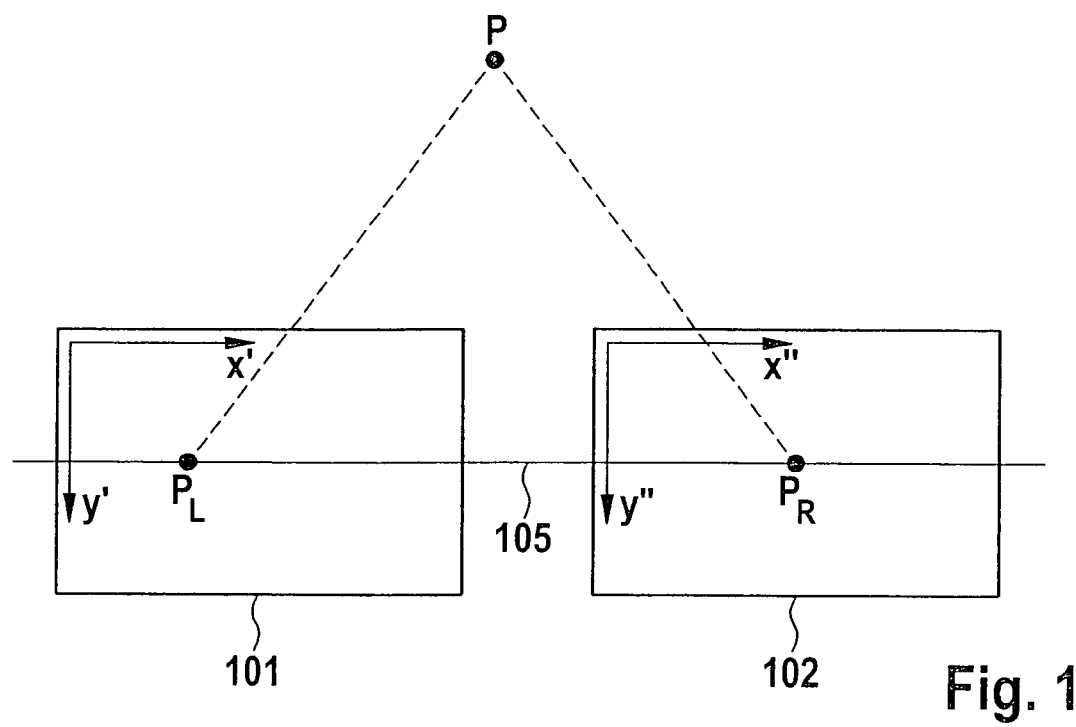
FIG. 1 illustrates a principle of a stereo measurement and a 3D triangulation.

In the subsequent description of exemplary embodiments of the present invention, the same or similar reference numerals are used for the various elements shown in the various figures and acting similarly, while omitting a repeated description of these elements.

FIG. 1 shows a principle of a stereo measurement and a 3D triangulation according to one exemplary embodiment. A left image 101 and a right image 102 are shown. Images 101, 102 may each have been taken by a camera or a stereo-video system, and may have a plurality of pixels. For example, in image 101 a pixel $p_L$ is shown and in image 102 a pixel $p_R$. Pixels $p_L$ and $p_R$ are situated on a common scanning row 105. The position of a pixel $p_R$ in image 101 may be given using an x'-y' coordinate system. The position of a pixel $p_L$ in image 102 may be given using an x"-y" coordinate system. Pixels $p_L$ and $p_R$ image a real point p. A distance determination of point p may be determined from the positions of points $p_L$ and $p_R$ using triangulation.

For the highly accurate 3D determination of geometrical features from stereo-video image data, the intrinsic and extrinsic parameters determined by a camera calibration process have to be taken into account. Based on an imaging model, the intrinsic parameters describe the functional connection that an image ray experiences, starting from a physical surface in the object scene, through the objective of the camera and up to its imaging on the sensor surface. The intrinsic parameters, among other things, describe the optical focal length and the optical distortion. The extrinsic parameters, by contrast, describe the mutual geometrical situation of the cameras of the stereo-video system with respect to each other. This is the relative position and the angular position of the cameras with respect to each other. In a stereo-video system, in general, the projection center of the one camera relative to the projection center of the other camera is described, which is also designated as the relative orientation.

Using a calibrated stereo-video system, the object scene taken may now be measured, by first detecting corresponding pixels and then triangulating them spatially by forward intersection. FIG. 1 schematically shows the process of stereo measuring from two images 101, 102.

Figure 2:
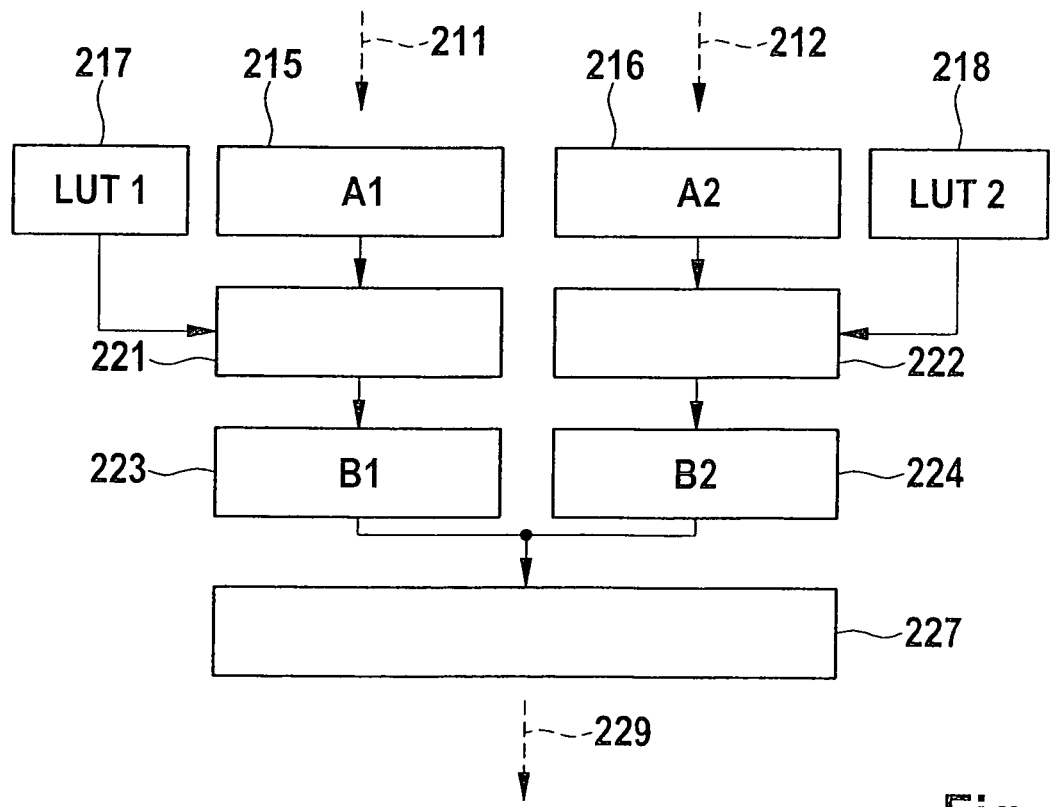
FIG. 2 shows a data flow for the stereo-video processing.

FIG. 2 shows a data flow for stereo-video image processing according to one exemplary embodiment. From a first camera, a left image stream 211 is able to be received, and from a second camera, a right image stream 212. Left image stream 211 is able to provide a left distorted stereo image A1 215 and right image stream 212 is able to provide a second stereo image A2 216. Furthermore, a first look-up table LUT1 217 and a second look-up table LUT2 218 may be provided. First look-up table 217 may be assigned to left image stream 211 and second look-up table 218 may be assigned to right image stream 212. Look-up tables 217, 218 may include data for rectifying the respective stereo images 215, 216. From first distorted stereo image 215 and first look-up table 217, a first rectified image B1 223 may be ascertained, using a first rectification 221. From second distorted stereo image 216 and second look-up table 218, a second rectified image B2 224 may be ascertained, using a second rectification 222. Based on rectified images 223, 224 a stereo measurement 227 may be carried out. Distance data 229, for example, may be provided, based on the stereo measurement.

FIG. 2 generally describes a method for real time stereo image processing. Data stream 211, 212 from the left and the right camera is first rectified 221, 222 in a computer unit. After that, there is a disparity measurement 227 between the left and the right image pair 223, 224. Disparity measurement 227 then permits the 3D computation of features in the camera's nearfield. We shall now describe a method of rectification. Known methods may be used for the real time disparity measurement.

According to this exemplary embodiment, FIG. 2 shows the possible sequence of a stereo measurement in a computer hardware. For optimized processing, image data 215, 216 are first rectified 221, 222, so that the intrinsic and extrinsic parameters, determined by calibration, may stay in consideration in a simple manner in the individual processing steps. The geometrical relationships may then be described using a simple pinhole camera model. Rectified stereo image data 223, 224 correspond to the so-called stereonormal case. Subsequently, a disparity measurement 227 is made for the distance determination of the 3D features. Because of rectification 221, 222, disparity measurement 227 is able take place in one row of digital image 223, 224, whereby a computing technology implementation is made substantially easier.

For the real time video image rectification, there is also the difficulty that in the clock cycle of image taking 215, 216 rectification 221, 222 has also to be processed, since it represents the basis for real time algorithms. For the rapid sequential processing in a computing hardware, for each pixel, the displacement vectors between its actual (distorted)

position and its setpoint position (rectified) is able to be computed ahead of time in the form of a look-up table (LUT) 217, 218 and filed in a memory. In the case of stereo cameras, two LUT's, 217, 218 have to be computed ahead of time. One LUT 217, 218 represents the generic computation rule for rectifying a camera image 215, 216, and it includes displacement vectors having a differential dx and dy component.

Figure 3:
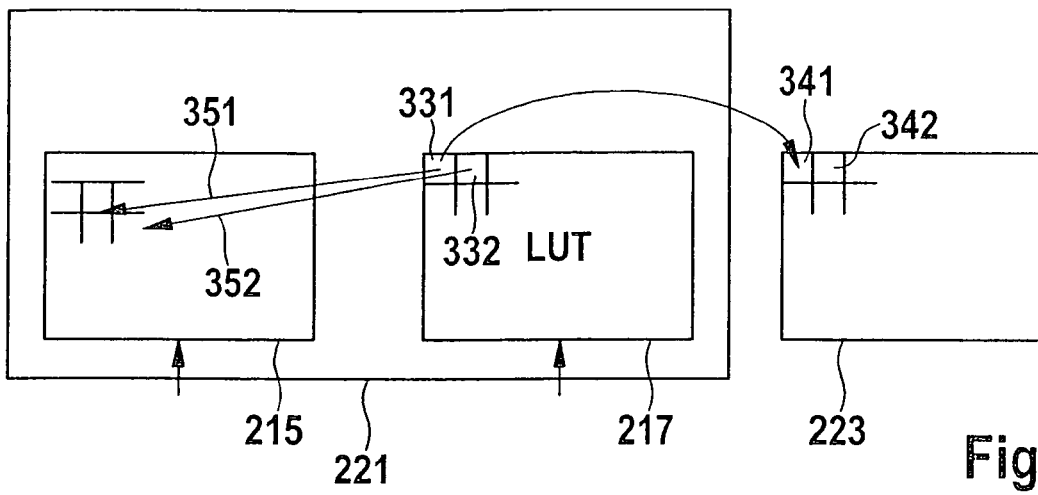
FIG. 3 illustrates a principle of the image rectifying with the aid of a look-up table.

FIG. 3 describes a principle of image rectification, on which the method step of rectification 221, described, for example, in FIG. 2, may be based. In this instance, with the aid of a received look-up table LUT 217, a received original image 215 may be converted to a rectified image 223. According to this exemplary embodiment, look-up table 217 has a plurality of entries 331, 332. Entries 331, 332 may be assigned to positions 341, 342 of rectified image 223. According to this exemplary embodiment, entry 331 has a displacement vector 351, which points to a position of original image 215, at which there is located a pixel which is positioned at position 341 of the rectified image for image rectification. Corresponding to this, entry 332 has a displacement vector 352, which points to a position of original image 215, at which there is located a pixel which is positioned at position 342 of the rectified image, for image rectification.

In real time stereo-video image rectification, for the processing, the data streams of two input images, two look-up tables and two output images have to be processed simultaneously in the computing unit. The currently limiting factor in real time processing of the object mentioned is the transferring of data volumes that come about due to input images, look-up tables and output images. The processing of VGA stereo-video images at a resolution of 640×480 pel, 8 bits per pixel and 25 Hz, produces an image data stream of 128 Mbit/s. The parallel reading of the look-up table for rectification from a memory in, for example, an FPGA based computing unit requires the same data rate. This makes real time stereo hardware relatively costly.

The alternative, namely, storing the look-up tables in the FPGA computing unit, for example, causes great memory usage in the FPGA because of the size of the look-up tables, and requires the use of costly Fog's.

The present invention is concerned in particular with the data streams of the two look-up tables. In contrast to the image data, the content of these look-up tables, that is to be transferred, remains the same, and represents a considerable proportion of the data volume. Instead of transferring these completely, a coding-decoding rule is used which considerably reduces the data volume of the look-up tables. The coding of the look-up tables is carried out ahead of time, at one time, outside of the real time processing. The decoding, on the other hand, has to be carried out in real time, in favor of reduced data volume.

A stereo rectification is, in principle, a distortion of the input image and the generation of an output image. The look-up table includes the rule for the distortion. For each pixel $(x\_ra_y)$ of the rectified image a look-up table for the stereo rectification includes a displacement vector (dx,dy). The displacement vector determines from which pixel $(x_0,y_0)$ of the input image the gray-scale value for the position $(x_r, y_r)$ is to be taken.

The functional connection is:

$$X_0 = X_r + dx$$

$$Y_0 = Y_r + dy$$

Figure 4:
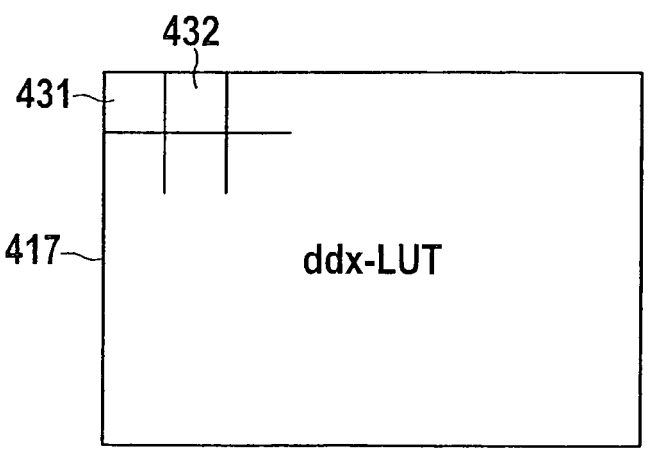
FIG. 4 illustrates a principle of the vector differences within the look-up table.

FIG. 4 shows a compressed look-up table ddx-LUT 417 according to one exemplary embodiment of the present invention. Compressed look-up table 417 has a plurality of entries 431, 432. According to this exemplary embodiment, entry 431, which is situated in the left upper corner, has the original vector, corresponding to the look-up table shown in FIG. 3. Entry 432, however, does not have the original vector but a difference. A current vector to entry 432 comes about from previously computed vector 431 in the adjacent position plus current entry 432 in ddx-LUT look-up table 417. Thus, compressed look-up table 417 is able to be decompressed in that current vectors are determined from the plurality of entries 431, 432. The current vectors may be entered in a decompressed look-up table, and made available for the rectification. Apart from entry 432, look-up table 417 may thus only have difference amounts, which each define a difference of a current displacement vector from an assigned adjacent displacement vector, which preferably has already been determined.

The look-up table mathematically represents a displacement vector field. That is relatively smooth, as a rule. Therefore, according to the present invention, the entries of the look-up table may be described as differences in relation to the adjacent entries. A "difference LUT" 417 is created, which will be designated as dd-LUT 417 below. As shown in FIG. 4, the current displacement vector is computed by decoding from the previously computed displacement vector of the adjacent position, added to current entry of dd-LUT 417. The following applies:

$$dx(x, y) = dx(x-1, y) + ddx(x, y)$$

$$dy(x, y) = dy(x-1, y) + ddy(x, y)$$

The formation of the dd-LUT 417 is a first step in the coding method.

For digital processing, the differences, i.e. the entries in dd-LUT 417 have to be discretized. With that, the latter may be coded further. Based on the smooth course of the displacement vector field already mentioned, zero entries frequently occur in dd-LUT 417. For this reason, run length coding is available for further compression.

Figure 5:
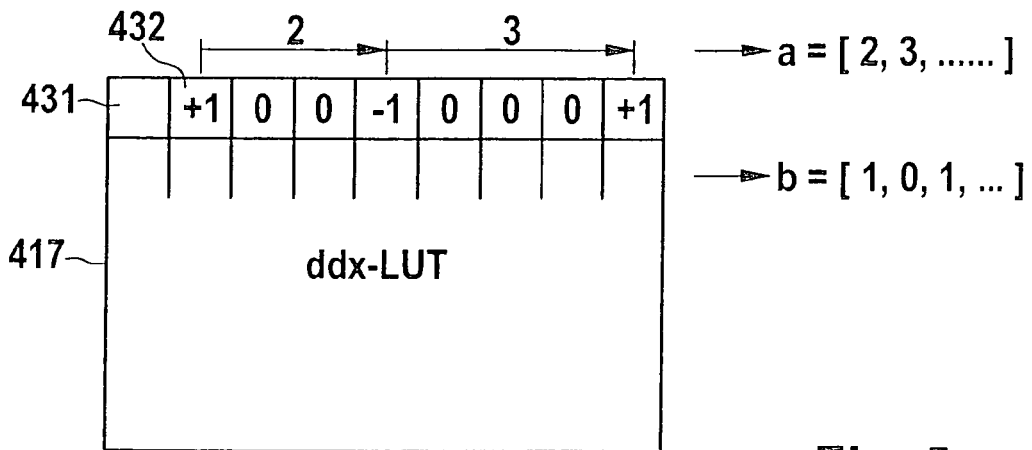
FIG. 5 illustrates a principle of the run length coding of a differential look-up table.

FIG. 5 shows a principle of run length coding of a differential LUT 417, as is shown, for example, in FIG. 4. According to this exemplary embodiment, look-up table 417 has a value of the original vector in the first entry. The subsequent entries have differences from the respectively preceding entry. Thus, an entry 432 following first entry 431 has the value "+1". This means that a current vector for this position is increased by one compared to the current vector of the preceding position, adjacent on the left, in this case. The two subsequent entries have the value "0". This means that the current vectors, at these positions, do not differ from the vector in the preceding position. The subsequent entry has the value "−1". This means that the current vector for this position is lowered by 1, compared to the preceding current vector. The three subsequent entries again have the value "0", and an additional subsequent entry has the value "+1". For the run length coding, run length entries and difference change entries may be used.

Thus, a first run length entry may have the value "2", based on the first two "0" entries, and a second run length entry may have the value "3", based on the second three "0" entries. From this, the coding yields a vector having the distance between entries unequal to "0" as a=[2, 3, . . . , . . . ]. The difference change entries, which indicate an absolute quantity change of the current vector compared to a preceding current vector, may also be combined in a vector. Thus, the coding yields a vector b having {+1,−1} as b=[1, 0, 1, . . . ]. A corresponding coded rectifying rule, according to this exemplary embodiment, may have the displacement vector of first entry 431 and vector a as well as vector b. From these data one is able to determine the displacement vectors for all entries of a corresponding look-up table for rectifying the image.

Thus, according to the exemplary embodiment shown in FIG. 5, in vector a the distance of the dd-LUT entries is stored unequal to zero, and in vector b the state of whether a positive or negative difference change is involved is stored.

The run length coding is a second step of the coding method.

The computing rule of the decoding follows from the inversely applied coding method.

Figure 6:
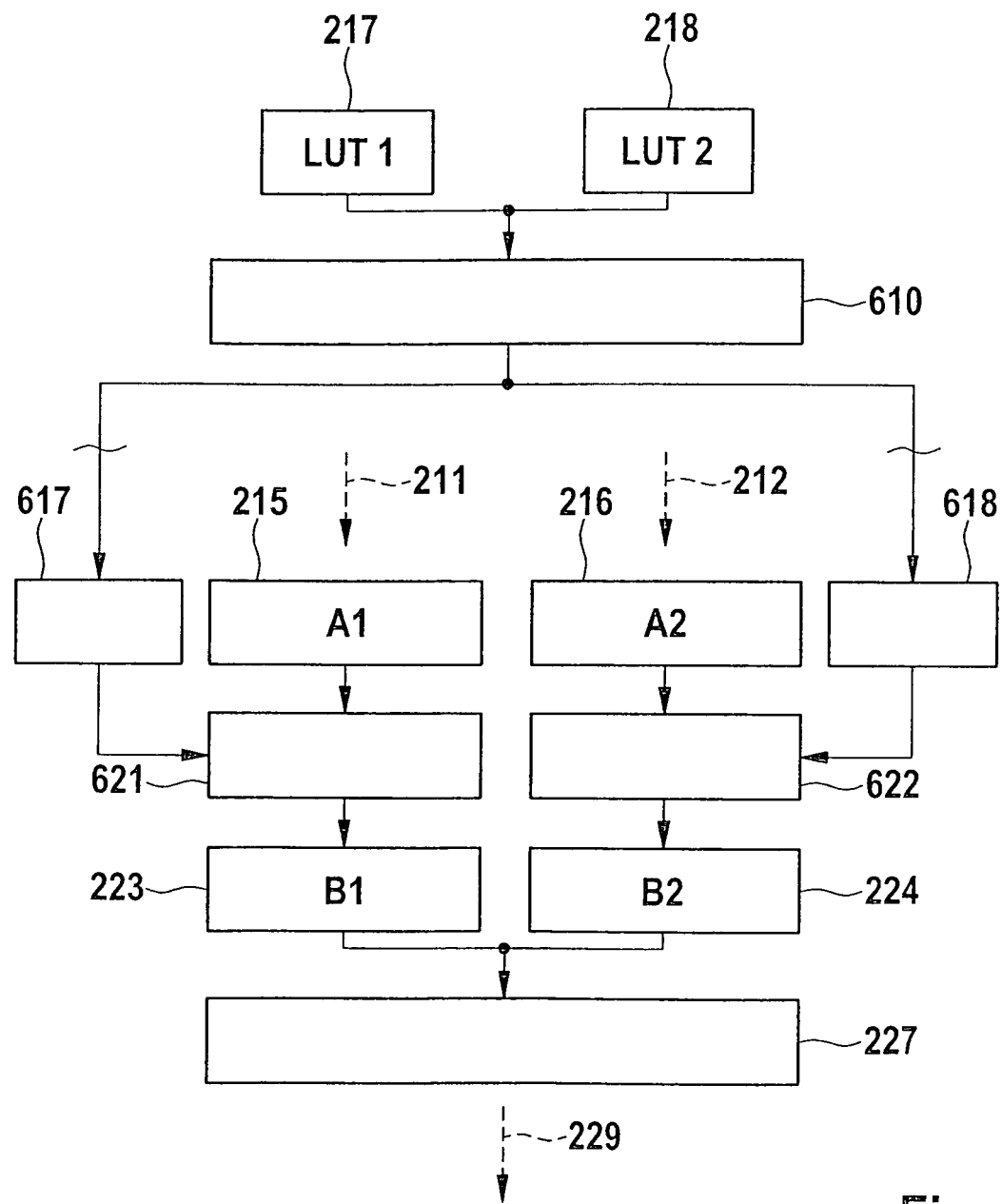
FIG. 6 shows a data flow of a stereo-video image processing according to an exemplary embodiment of the present invention.

FIG. 6 shows a changed data flow of the stereo-video image processing according to an exemplary embodiment of the present invention. The look-up tables may be coded ahead of time, in an initial work step. The look-up tables, that are coded and thereby reduced in data volume, may then be transmitted to the computing hardware. According to the present invention, the possible sequence of a stereo measurement is broadened in a computing hardware by the steps of the method according to the present invention.

Based on a calibration of a first camera, the first look-up table LUT1 217 may be determined, and based on a calibration of a second camera, the second look-up table LUT2 218 may be determined. The cameras may be part of a stereo-video system. Look-up tables 217, 218 may become coded 610. During coding 610 of look-up tables 217, 218, from first look-up table 217 a first compressed look-up table 617 may be determined, in the form of a coded LUT1, and from second look-up table 218 a second compressed look-up table 618 may be determined, in the form of a coded LUT2.

The compressed look-up tables may be used, according to the method of the present invention, for rectification, for rectifying first camera image A1 215 and second camera image A2 216. First camera image 215 may be received via left image stream 211 and second camera image 216 may be received via right image stream 212. In step 621, decoding may take place of the first compressed look-up table 617, so as to obtain a decoded first look-up table, which is able to correspond to first look-up table 217. Consequently, the decoded look-up table may include a decompressed rectifying rule having a plurality of displacement vectors, which are able to define the association between the plurality of distorted pixels of image 215 and the plurality of the distorted pixels of distorted image 223. Thereafter a rectification may take place of first camera image 215, using the decoded first look-up table, so as to obtain rectified first image B1 223. Corresponding to this, in step 622, decoding may take place of second compressed look-up table 618, so as to obtain a decoded second look-up table, which is able to correspond to second look-up table 218. Thereafter a rectification may take place of second camera image 216, using the decoded second look-up table, so as to obtain rectified second image B2 224. Based on images 223, 224, stereo measurement 227 may be carried out, and distance data 229 may be made available.

For images received subsequently in time, which are received corresponding to images 215, 216, the steps of receiving look-up tables 617, 618 may be carried out, and steps 621, 622 of decoding and rectification may be carried out repeatedly, so as to obtain subsequent rectified images. Consequently, one associated look-up table may be received continuously for each image received.

According to the exemplary embodiment shown in FIG. 6, after the calibration of the cameras and the computation of look-up tables 217, 218, first a coding 610 of look-up tables 217, 218 may take place for the efficient storage of the look-up tables in the computing hardware. This step takes place before the stereo real time processing.

An image rectification 621, 622 may take place for the real time image rectification, during real time stereo-video processing, a continuous decoding being able to take place of compressed look-up table data 617, 618.

According to this exemplary embodiment, the decoding may run as follows. As in the coding of the look-up table, the coding may take place in two steps.

First, the run length coding is to be decoded. This may be implemented very simply in hardware via a logic. The decoded run length is stored from the vector into a counter.

In the second step, the current displacement vector is computed for pixel correction. In the process, the counter is decremented in video clock for the storage of the run length. When the zero position of the counter is reached, the current displacement vector is incremented or decremented in vector b corresponding to the bit entry. The next run length entry is read out of vector a into the counter.

The implementation of the decoding method using a logic, a counter and a memory for the current value of the look-up table vector, makes the method described particularly suitable for implementation in an FPGA hardware or an ASIC hardware.

According to an alternative exemplary embodiment, instead of coding the differences of the look-up tables, one may also use differences of a higher order for coding. The computing rule for the coding and decoding having differences of the second order is shown in the following formula:

$$ddx^2(x, y)=2*dx(x, y)-dx(x-1, y)-dx(x+1, y)$$

$$ddx^2(x, y)=2*dx(x, y)-dx(x-1, y)-dx(x+1, y)$$

According to one additional exemplary embodiment, the run length coding of the dd-LUT may be omitted or replaced by other coding methods known from data compression, such as Huffman codes or LZW methods.

The method according to the present invention may be used for the real time correction of geometrical distortions of optics, even in mono-video systems, such as in monitoring cameras.

The exemplary embodiments described and shown in the figures have been selected only in exemplary fashion. Different exemplary embodiments are able to be fully combined with one another, or with regard to individual features. One exemplary embodiment may also be supplemented by features of another exemplary embodiment. Furthermore, method steps according to the present invention may also be carried out repeatedly, as well as in a different sequence than the one described.

What is claimed is:

1. A method for rectifying a camera image, comprising:
   receiving, via an interface, distorted pixels of a distorted camera image;
   providing a compressed rectifying rule, wherein the compressed rectifying rule includes multiple displacement vector entries;
   decompressing the compressed rectifying rule to obtain a decompressed rectifying rule for rectifying the distorted camera image, wherein the decompressed rectifying rule includes multiple displacement vectors defining the associations between the distorted pixels and the rectified pixels; and
   determining, using the decompressed rectifying rule, rectified pixels of the distorted camera image from the distorted pixels;
   wherein during decompression, one displacement vector is determined from the multiple displacement vector entries for each of the rectified pixels.

2. The method as recited in claim 1, wherein a subsequent displacement vector is determined from a subsequent displacement vector entry assigned to a subsequent rectified pixel and from a preceding displacement vector assigned to a preceding rectified pixel.

3. The method as recited in claim 2, wherein the subsequent displacement vector entry defines a difference amount from the preceding displacement vector.

4. The method as recited in claim 1, wherein:
the compressed rectifying rule has a plurality of run length entries and a plurality of difference change entries;
if a run length entry assigned to the subsequent rectified pixel has a first value, a subsequent displacement vector of a subsequent rectified pixel corresponds to a preceding displacement vector of a preceding rectified pixel; and
if the run length entry assigned to the subsequent rectified pixel has a second value, the subsequent displacement vector is determined from the preceding displacement vector and a difference change entry assigned to the subsequent rectified pixel.

5. The method as recited in claim 4, wherein the method steps are executed in real time.

6. A method for rectifying a stereo camera image, comprising:
receiving first distorted pixels of a first distorted camera image and second distorted pixels of a second distorted camera image, via an interface;
providing a first compressed rectifying rule and a second compressed rectifying rule, wherein the first and second compressed rectifying rules each include multiple displacement vector entries;
decompressing the first compressed rectifying rule and the second compressed rectifying rule, so as to obtain a first decompressed rectifying rule for rectifying the first distorted camera image and a second decompressed rectifying rule for rectifying the second distorted camera image; and
determining first rectified pixels of a first rectified camera image from the first distorted pixels, using the first decompressed rectifying rule and second rectified pixels of a second rectified camera image from the second distorted pixels, using the second decompressed rectifying rule;
wherein the first decompressed rectifying rule includes multiple displacement vectors defining the associations between the first distorted pixels and the first rectified pixels, and wherein the second decompressed rectifying rule includes multiple displacement vectors defining the associations between the second distorted pixels and the second rectified pixels, and wherein during decompression, one displacement vector is determined from the multiple displacement vector entries for each of the rectified pixels.

7. A control unit for rectifying a camera image, comprising:
means for receiving distorted pixels of a distorted camera image;
means for providing a compressed rectifying rule, wherein the compressed rectifying rule includes multiple displacement vector entries;
means for decompressing the compressed rectifying rule to obtain a decompressed rectifying rule for rectifying the distorted camera image, wherein the decompressed rectifying rule includes multiple displacement vectors defining the associations between the distorted pixels and the rectified pixels; and
means for determining, using the decompressed rectifying rule, rectified pixels of the distorted camera image from the distorted pixels;
wherein during decompression, one displacement vector is determined from the multiple displacement vector entries for each of the rectified pixels.

* * * * *